UNITED STATES PATENT OFFICE.

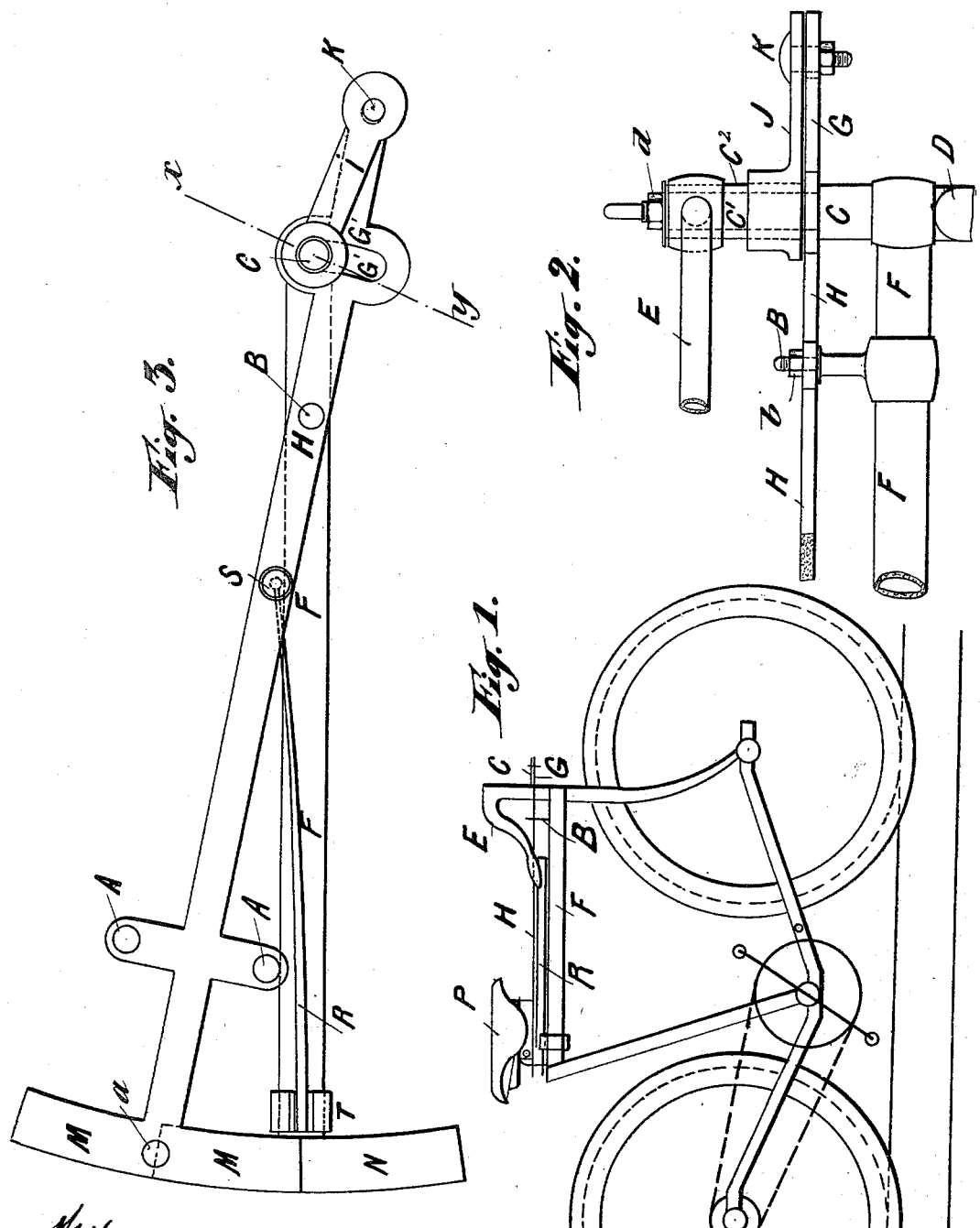

PHILIPPE WAGNER, OF CONSTANTINOPLE, TURKEY.

BICYCLE RUNNING ON RAILS.

SPECIFICATION forming part of Letters Patent No. 626,580, dated June 6, 1899.

Application filed October 24, 1898. Serial No. 694,443. (No model.)

*To all whom it may concern:*

Be it known that I, PHILIPPE WAGNER, a citizen of the Republic of France, residing at Constantinople, Turkey, have invented certain new and useful Improvements in Bicycles Running on Rails, of which the following is a specification.

The present invention relates to bicycles; and it has more particular reference to a machine of this class intended to run along a single rail and allowing of obtaining an easy balance by the lateral movement of the cyclist's body by means of the handle-bar.

Hitherto traveling on railway-tracks has been possible only with a four-wheeled velocipede, which on account of its weight occasioned great fatigue, and therefore required several persons to move it when the distance to be traveled over was rather long. On the other hand, the use of bicycles for traveling over rails was rendered impossible through the necessity of making the front or leading wheel turn to the right or left in order to balance the whole. These inconveniences are done away with the bicycle contemplated as an object by the present invention by keeping the front wheel in a rigid position with respect to the frame of machine and by balancing by the lateral movement of the cyclist's body through the agency of the handle-bar, which, aided by a suitable device, allows the saddle to be moved to the right or to the left of the direction-line, as more fully described and claimed hereinafter.

In the annexed drawings is shown one form of embodiment of my invention, in which—

Figure 1 is a diagrammatic view in elevation of the bicycle. Fig. 2 is an enlarged detail view in elevation showing the balancing device, and Fig. 3 is a plan view of the same.

In the different figures similar letters of reference denote corresponding parts.

A A is the cross-bar supporting the saddle.

B is the pivot of the movable lever.

C is the upper tube of the front fork.

C' is the handle-bar pivot.

$C^2$ is the socket of the handle-bar stem.

D is the front fork, E the handle-bar, and F the upper frame-tube.

GH is the movable lever, provided with slot G'.

I is the operating-lever.

K is the articulation-axis of the levers I and GH.

M is a sliding plate.

N is the bearing of the sliding plate M.

P indicates the saddle.

R is a controlling-spring, and, finally, S is the securing-button of the spring.

The bicycle shown in Fig. 1 does not differ much in form or weight from the ordinary ones. There is, however, a difference in the arrangement of the handle-bar, saddle, and wheel-rims. The saddle P is secured to the bar A A of the lever GH, and therefore moves with this lever around the pivot B, secured to the tube F of the frame, and on which the nut *b* is screwed to hold the lever H, Figs. 2 and 3. The sliding plate M, arranged at the back end of the lever H, is provided with an oiling-hole *a* and slides on the bearing N, secured to the frame, or it may slide on rollers instead of said bearing, and thus reduce the friction. The branch G of the lever GH is provided with a slot G', through which passes the pivot C' of the front fork. This branch is articulated at its end with the lever I by means of the bolt K, Figs. 2 and 3. The operating-lever I is secured perpendicular with regard to the handle-bar to the socket $C^2$ of this latter and moves with it around the pivot C', secured to the tube C and threaded at its end, receiving the nut *d*, holding the handle-bar, Fig. 2. The controlling-spring R, Fig. 3, is secured, on the one hand, to the tube F of the frame by means of the tightening-collar T and held, on the other hand, by means of the button S, secured to the lever H. This spring tends to bring the lever H back to its mean position.

The rims of the wheels of this bicycle, Fig. 1, are made of sheet-steel and assume a concave shape. Furthermore, they are provided on each side with a flange, so as to fit over the rail.

With this bicycle the balance device operates as follows: If during the running the machine tends to fall, for instance, to the right, the cyclist works the handle-bar as with an ordinary bicycle—that is, he brings the handle-bar to the position indicated by the line X Y, Fig. 3. The result is that the lever I moves the arm G of the lever GH also toward the right, while the arm H, and therefore the saddle and the cyclist, moves toward the left with respect to the direction-line. Owing to the displacing of the center of gravity of the whole the equilibrium will be re-established and the cyclist will occupy again his normal position with a reversed operation of the handle-bar, said operation being aided by the action of the spring R.

Having fully described my invention, what I claim, and desire to secure by Letters Patent, is—

In a bicycle running on a single rail, the combination with the frame the movement transmission devices and the wheels having steel concave-shaped rims; of a moving lever turning around a pivot and provided at its back portion with a cross-bar to support the saddle and with a sliding bar for the guiding, and at its fore portion with a slot the pivot of front fork extending therethrough; a pin secured to the upper tube of the frame and around which pivots the preceding lever; a spring secured on the one hand to the frame and on the other hand to the moving lever to bring said lever back into its normal position; a pin secured to the upper tube of the front fork and around which turns the handle-bar; a handle-bar provided with a socket to secure an operating-lever thereto, finally an operating-lever secured to the handle-bar socket and pivoted to the fore end of the moving lever to actuate the said lever, substantially as described and for the purpose set forth.

PHILIPPE WAGNER.

Witnesses:
D. L. DEMETRIADES,
F. BASTCLICIER.